Jan. 8, 1924.
N. STATHAM
1,480,027
FASTENER OPERATING DEVICE
Filed March 28, 1919
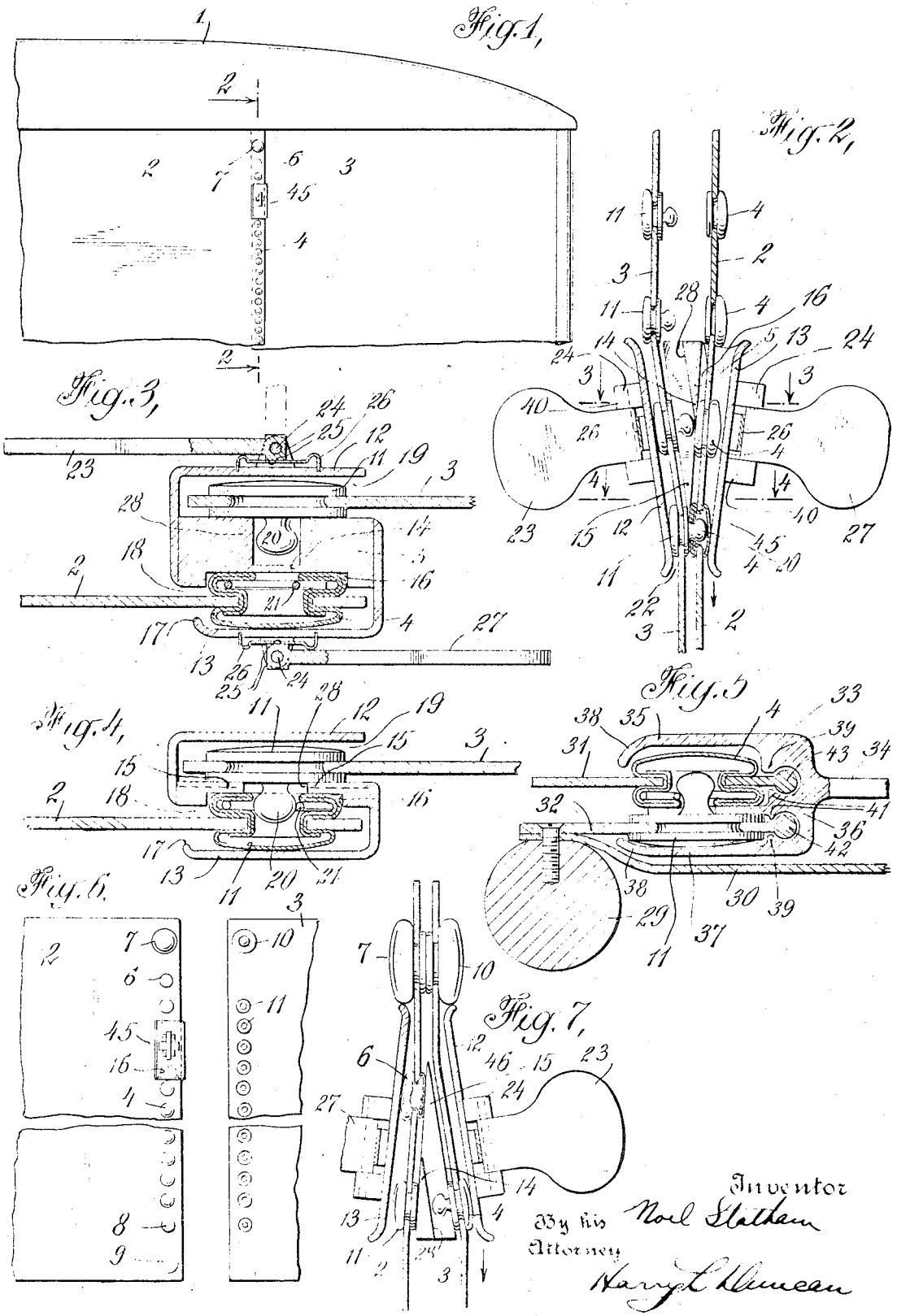

Patented Jan. 8, 1924.

1,480,027

UNITED STATES PATENT OFFICE.

NOEL STATHAM, OF HASTINGS UPON HUDSON, NEW YORK.

FASTENER-OPERATING DEVICE.

Application filed March 28, 1919. Serial No. 285,861. REISSUED

*To all whom it may concern:*

Be it known that I, NOEL STATHAM, a subject of the King of Great Britain, and resident of Hastings upon Hudson, county of Westchester, State of New York, have made a certain new and useful Invention Relating to Fastening - Operating Devices, of which the following is a specification, taken in connection with the accompanying drawing.

This invention relates especially to operating devices for quickly and effectively closing or opening snap fasteners of various kinds which may be secured in a closely spaced row or series to the edges of garment or other fabric members or to special tapes or strips adapted for application to garments or other articles. A closing or operating device may be detachably or permanently associated with such a strip or row of fasteners and may comprise a separator formed with guide grooves or directing means for the different fastener elements so that in connection with cooperating guiding means suitably associated with the separator in any desired way as by being in the form of closing plates or guides on each side of the separator, the snap or other fasteners passing through the device may be progressively brought together and locked when the closing device is moved in one direction along the seam. When the operating device is moved in the opposite direction the wedging portions or members which are preferably formed on the separator are forced between the cooperating units of a fastener so as to loosen and then progressively separate them as the operating device moves along the seam.

In the accompanying drawing showing in a somewhat diagrammatic way illustrative embodiments of this invention—

Fig. 1 is a diagrammatic elevation showing a set of these fasteners and operating devices used in connection with an automobile curtain.

Fig. 2 is an enlarged sectional view showing the operating device arranged so that downward movement opens the associated fasteners.

Fig. 3 is a transverse sectional view taken substantially along the line 3—3 of Fig. 2.

Fig. 4 is a similar sectional view taken along the line 4—4 of Fig. 2.

Fig. 5 is a sectional view showing a modified form of construction.

Fig. 6 is an enlarged side view showing a modified arrangement.

Fig. 7 is a corresponding side sectional view thereof.

For purposes of illustration this device is shown in connection with an automobile curtain to the edges of which the rows or series of fastener elements may be secured, the socket elements 4 of the fasteners being shown as arranged on the outer element 2 of the curtain seam, while the male or head elements of the fasteners may be arranged on the inner curtain member 3 as is shown more in detail in Figs. 3 and 6. The operating device 45 may comprise a separator 5 of brass or other suitable metal which as indicated in Fig. 3 may be formed with a head groove 28 adapted to accommodate and more or less guide the fastener heads 20, while on the other side of this separator and beyond the connecting web 14 thereof a socket groove 16 is preferably formed of such size as to properly accommodate the socket elements of the fastener, although, if desired, this lateral guiding action may be more or less effected by guiding members or ribs, such as 17, on the outer guides or plates, such as 13. Guide grooves for the fastener units or elements may advantageously be somewhat wider at the receiving end of the operating device so as to take care of slightly irregular positions of the fasteners and the grooves may gradually narrow toward the other end of the device so as to bring the fastener elements into proper alignment with each other as they are progressively forced together into holding or locking position. This is indicated in a somewhat diagrammatic way in Fig. 6 in connection with the socket groove 16. Furthermore, as indicated in Fig. 2 the closing plates or guides 12, 13 which may advantageously be formed of spring brass or other suitable material preferably of a somewhat resilient character may have flaring portions or entrance guides at each end as indicated at 22. The closing action of the operating device is indicated in Fig. 7 and as there shown the head and socket fastener elements on the seam edges 2, 3 are received in the flaring openings of the operating device so as to be guided by the grooves thereon and are thus brought into substantial axial alignment with each other as they are gradually forced together by the more or less resilient pressure of the closing guides 12, 13 on the studs on the opposite sides of these seam edges or other seam elements. Fig. 2 shows the opening movement of the operating device which when moved along the seam in the direction of the arrow forces the edge or wedging front portion 15 of the separator between the cooperating elements of a fastener so as to begin this opening movement and separate the parts sufficiently so that the progressively thickened web portion 14 can finally pass between the two fastener elements.

The operating device is preferably given sufficient length so that several fasteners are engaged simultaneously which promotes the certainty and reliability of its closing and opening action. The length of the device as shown in Figs. 2 and 6 is sufficient so that at least two fasteners are always in engagement therewith and thus the entering fastener element is more effectively guided into proper engagement with the grooves and surfaces of this operating device. This greatly facilitates the rapid and reliable opening and closing of a series of closely spaced snap or generally similar fasteners which may, if desired, have locking springs, such as 21, which usually have a more uniform and desirable holding action on the cooperating head element of the fastener, although, of course, in many cases the locking spring of this Kohinoor type of snap fastener may be omitted and the resilient action of the sheet metal fastener elements may be relied upon to hold the parts in closed or locked position. For many purposes it is desirable to have operating handles arranged on the fastener operating device and as indicated in Figs. 2 and 3 handles 23, 27 may in some cases be arranged on both sides of the operating device so that it can be actuated from either side of the same which is of course advantageous in the case of automobile curtains for example. It is sometimes desirable also to have these operating handles foldably or otherwise movably or detachably secured to the operating device and for this purpose a pivot or connecting pin 24 may secure the handle to suitable lugs or ears, such as 40, which may be secured to the closing plates or guides 12, 13. A tight engagement between this pin and the handle may in some cases hold it sufficiently in any adjusted position, although it is usually desirable to have a special holding device such as the holding spring 26 as shown in Fig. 3 which may engage any one of the squared or polygonal faces 24 of this operating handle so as to resiliently hold it in full line position shown or in the dotted projecting position in which it is more convenient for use. If desired, however, the operating device may in some cases be formed with a rigidly connected operating handle such as 34 which may, if desired, be formed integral with the operating device, as shown in Fig. 5. The operating device 33 may comprise integrally or securely connected closing plates 35, 37 held in proper alignment with a separator 36 of any suitable form so as to form an E sectioned operating device and properly cooperate with the fastener supports or similar members 31, 32. In this instance one of the fastener supports 32 is preferably relatively rigid or stiff, and may be a strip of sheet brass or other metal screwed or otherwise secured to a frame member or supporting device 29 in connection with one of the fabric edges 30. Thus the two sets of cooperating fastener units 4, 11 are connected to seam members or fastener supports having edges extending in the same direction instead of in opposite directions as in the case of the fabric curtains or members shown in Figs. 1 to 4. If desired the outer members of this operating device may be formed with lateral guide portions or members, such as 38, 39, to promote the lateral alignment of the fastener elements passing through the device. In some cases, also, it is desirable to have edge beads or more or less continuous enlargements formed on one or both of such seam members, as 42, 43, and in such cases additional guiding devices 41 may be formed on the operating device so as to sufficiently enclose these enlarged or beaded edge portions to ensure the proper lateral alignment of the connected seam members as they move through the operating device. In such cases it is not always necessary to have the snap or other fasteners so closely spaced on the seam fabric or other member and the operating device need not have such great length along the seam, which is advantageous in some connections.

For many purposes it is desirable to use suitable initial aligning means to bring the cooperating fastener units into proper alignment, especially in the case of garment seams or such seams as sometimes occur in automobile curtains where one of the curtain elements is adapted to be bodily removed. In such cases it is advantageous to have initial aligning fastener elements such as 7, 10, which may be arranged at the top or bottom of the seam or both, so that it may be initially fastened by hand and thus bring the adjacent fastener elements into substantially proper alignment with each other and with the operating device for closing or opening them. As seen in connection with Fig. 6, the initial fastener may be a snap fastener of special or distinctive shape or large size, and when the two elements 7, 10 of this fastener are brought together the seam edges are thus brought into properly overlapping position and the adjacent fasteners 4, 11 are also substantially in line with each other which facilitates the subsequent closing and locking thereof. In order to keep the operating device 45 in engagement with one set of the fastener units it is desirable to provide an aligning guide fastener or device, such as 6, 8 at one or both ends of one of the rows of fastener units so that, for example, the operating device remains in engagement therewith and can thus be more readily brought into alignment with the cooperating fastener units on the other seam element for closing purposes. Any suitable retaining device may be used for this purpose and the large sized initial aligning fastener element 7 or 9 is sufficient to prevent the operating devices moving past the same or becoming disengaged from this row of fastener elements. Where the operating device is given such an S-sectioned shape as previously described it is desirable to omit the fastener unit on the other seam element which corresponds to such an aligning guide member as 6 and thus when the initial aligning elements 7, 10 are closed and locked together by hand the operating device 45 which is then naturally closely adjacent this end of the row of fastener elements may have the edge of the other seam element 3 simultaneously slipped into the same so that the headed fastener elements 11 on this side of the seam may then be readily engaged by the fastener and closed and locked as the fastener is rapidly moved down the seam to the other end in closing the seam. The reverse movement of the operating device naturally separates and opens the fasteners and when the entire row of fastener units 4, 11 is opened the fastener operating device 45 is closely adjacent or in contact with the initial aligning fastener elements 7 so that the operator's hand can conveniently engage this fastener unit and disengage it from the cooperating fastener unit 10 where the seam elements are to be separated or removed. For some purposes it is desirable to make the aligning guide device 6 of special form or character so that it has sufficient resilience to yieldingly retain the operating member in engagement therewith and as shown in Fig. 7 this aligning member 6 may be of special size and construction and may, if desired, have a spring yielding portion 46 adapted to sufficiently engage the separator 15 so as to retain the parts in substantially this position until the operating device is to be used again as in closing the fastener units.

This invention has been described in connection with a number of illustrative embodiments, forms, proportions, sizes, parts, materials, arrangements, and methods of manufacture and use, to the details of which disclosure the invention is not of course to be limited, since what is claimed as new and what is desired to be secured by Letters Patent is set forth in the appended claims.

I claim—

1. In seam fasteners, a pair of flexible seam elements having thereon adjacent the seam edges rows of closely spaced cooperating snap fastener elements, a fastener operating device permanently held in engagement with one of said rows of fastener elements and formed with a separator and with cooperating guides on each side of said separator to hold said fastener units in engagement with the grooves in said separator and effect their substantial lateral alignment as the units of each fastener are gradually forced together during the closing movement of said operating device, said operating device having operating handles movably mounted on each side of the same and holding springs cooperating with said handles to yieldingly hold them in folded or in projecting operating position.

2. In seam fasteners, a pair of flexible seam elements having thereon rows of closely spaced cooperating snap fastener elements, a fastener operating device in engagement with one of said rows of fastener elements and formed with means to effect their substantial lateral alignment as the units of each fastener are gradually forced together during the closing movement of said operating device, said operating device having operating handles movably mounted on each side of the same and holding means cooperating with said handles to yieldingly hold them in folded or in projecting operating position.

3. In seam fasteners, a pair of flexible seam elements having thereon rows of closely spaced cooperating snap fastener elements, a fastener operating device formed with means to effect their substantial lateral alignment as the units of each fastener are gradually forced together during the closing movement of said operating device, said operating device having operating handles movably mounted on each side of the same and adapted to remain in folded or in projecting operating position.

4. In seam fasteners, a fastener operating device formed with a separator and with cooperating guides on each side of said separator to hold snap fastener units in engagement with said separator and effect their substantial alignment as the units of each fastener are gradually forced together during the closing movement of said operating device, said operating device having an operating handle movably mounted on the same and a holding spring cooperating with said handle to yieldingly hold the handle in folded or in projecting operating position.

5. In seam fasteners, a fastener operating device formed with guides to effect their substantial alignment as the units of each fastener are gradually forced together during the closing movement of said operating device, said operating device having an operating handle movably mounted on the same and means to yieldingly hold the handle in folded or in projecting operating position.

6. In seam fasteners, a pair of fabric seam elements each having thereon adjacent the seam edge a row of closely spaced cooperating fastener elements, an initial aligning fastener element adjacent one end of each of said rows, an initial guide member between one of said initial aligning fastener elements and the adjacent fastener element of the row, and a fastener operating device permanently held in engagement with one of said rows of fastener elements and formed with a separator and with cooperating guides to hold said fastener units and effect their substantial lateral alignment as the units of each fastener are gradually forced together during the closing movement of said operating device, said separator having wedging separating portions to effect the initial separation of the cooperating fastener units in opening the same.

7. In seam fasteners, a pair of fabric seam elements each having thereon adjacent the seam edge a row of closely spaced cooperating fastener elements, an initial aligning fastener element adjacent one end of each of said rows, and a fastener operating device permanently held in engagement with one of said rows of fastener elements and formed with cooperating guides to hold said fastener units and effect their substantial lateral alignment as the units of each fastener are gradually forced together during the closing movement of said operating device.

8. In seam fasteners, a pair of flexible seam elements each having thereon adjacent the seam edge a row of closely spaced cooperating fastener elements to be engaged and opened and closed successively by a fastener operating device, an initial aligning manually operated fastener element adjacent one end of each of said rows and an initial guide member between one of said initial aligning fastener elements and the adjacent fastener element of the row to resiliently engage said operating device.

9. In seam fasteners, a pair of flexible seam elements each having thereon adjacent the seam edge a row of cooperating fastener elements to be engaged and opened and closed successively by a fastener operating device, and an initial aligning fastener element adjacent one end of each of said rows.

10. In seam fasteners, a pair of seam elements each having thereon a row of cooperating snap fastener elements adapted to be engaged and opened and closed successively by a fastener operating device and an aligning fastener element having a distinctive size or shape as compared to the other elements and located in each of said rows.

11. In seam fasteners, a pair of seam elements each having thereon a row of cooperating snap fastener elements, an S-sectioned fastener operating device adapted to be permanently held in engagement with a row of snap fastener elements and formed with a grooved separator and with cooperating closing guides on each side of said separator to push said fastener units into engagement with the grooves in said separator and effect their substantial alignment during the movement of said operating device, said separator having lateral wedging separating portions to effect the initial separation of the cooperating fastener units in opening the same.

12. In seam fasteners, an S-sectioned fastener operating device adapted to be permanently held in engagement with a row of snap fastener elements and formed with a grooved separator and with cooperating guides on each side of said separator to hold said fastener units in engagement with the grooves in said separator and effect their substantial alignment during the movement of said operating device.

13. In seam fasteners, a seam element having thereon adjacent the seam edge a row of closely spaced snap fastener elements, and a fastener operating device permanently held in engagement with said row of fastener elements and formed with a grooved separator and with guides on each side of said separator to hold such fastener units in engagement with the grooves in said separator and effect their substantial lateral alignment during the movement of said operating device, said separator having a wedging separating portion to effect the initial separation of the cooperating fastener units in opening the same.

14. In seam fasteners, an S-sectioned fastener operating device formed with a separator and with cooperating resilient guiding and closing devices on each side of said separator to hold snap fastener units in substantial engagement with said separator and effect their substantial alignment as the units of each fastener are gradually forced together during the closing movement of said operating device, said operating device having an operating handle.

15. In seam fasteners, a fastener operating device formed with a separator and with cooperating resilient guiding and closing devices on each side of said separator to hold snap fastener units in substantial alignment as the units of each fastener are forced together during the closing movement of said operating device.

16. In seam fasteners, an S-sectioned fastener operating device adapted to be permanently held in engagement with a row of snap fastener units and formed with a separator having a groove adapted to accommodate the projecting heads of the male fastener units and with cooperating guides on each side of said separator to hold the fastener units in cooperation with said separator and effect their substantial alignment during the movement of said operating device.

17. In seam fasteners, a fastener operating device adapted to cooperate with a row of snap fastener units and formed with a separator having a groove adapted to accommodate the projecting heads of the male fastener units and with cooperating guides on each side of said separator to hold the fastener units in cooperation with said separator and effect their substantial alignment during the movement of said operating device.

NOEL STATHAM.